(12) United States Patent
Moisy et al.

(10) Patent No.: US 9,061,628 B2
(45) Date of Patent: Jun. 23, 2015

(54) VEHICLE HEADLIGHT MODULE MOUNTED ON SLIDERS, CORRESPONDING SUPPORT AND HEADLIGHT

(71) Applicants: Eric Moisy, Jaen (ES); Isidro Garcia, Jaen (ES); Jose-Antonio Aguilar Del Moral, Jaen (ES); Damien Cabanne, Martos (ES); Antonio Contrelas-Luque, Martos (ES); Jean-Francois Le Bars, Elchingen (DE)

(72) Inventors: Eric Moisy, Jaen (ES); Isidro Garcia, Jaen (ES); Jose-Antonio Aguilar Del Moral, Jaen (ES); Damien Cabanne, Martos (ES); Antonio Contrelas-Luque, Martos (ES); Jean-Francois Le Bars, Elchingen (DE)

(73) Assignee: Valeo Vision, Bobigny (FR)

( * ) Notice: Subject to any disclaimer, the term of this patent is extended or adjusted under 35 U.S.C. 154(b) by 335 days.

(21) Appl. No.: 13/626,074

(22) Filed: Sep. 25, 2012

(65) Prior Publication Data

US 2013/0141929 A1 Jun. 6, 2013

(30) Foreign Application Priority Data

Sep. 27, 2011 (FR) ...................................... 11 58612

(51) Int. Cl.

| B60Q 1/00 | (2006.01) |
|---|---|
| F21V 15/01 | (2006.01) |
| B60Q 1/26 | (2006.01) |
| F21S 8/10 | (2006.01) |

(52) U.S. Cl.
CPC .............. *B60Q 1/0064* (2013.01); *F21V 15/01* (2013.01); *B60Q 1/007* (2013.01); *B60Q 1/2696* (2013.01); *F21S 48/1104* (2013.01); *F21S 48/1305* (2013.01); *F21S 48/1388* (2013.01); *F21S 48/321* (2013.01)

(58) Field of Classification Search
CPC ... B60Q 1/0064; F21S 48/1305; F21S 48/321
USPC .................. 362/516, 519, 523, 547, 548, 549
See application file for complete search history.

(56) References Cited

U.S. PATENT DOCUMENTS

| 3,961,175 | A | * | 6/1976 | Otagoshi | ........................ 362/199 |
| 5,436,807 | A | * | 7/1995 | Kobayashi | ...................... 362/41 |
| 5,971,574 | A | * | 10/1999 | Taniuchi et al. | .............. 362/508 |
| 7,762,700 | B2 | | 7/2010 | Luo et al. | |
| 7,806,562 | B2 | | 10/2010 | Behr et al. | |
| 2008/0130308 | A1 | | 6/2008 | Behr et al. | |
| 2009/0296416 | A1 | | 12/2009 | Luo et al. | |

FOREIGN PATENT DOCUMENTS

| DE | 102009022723 | 12/2009 |
| FR | 2379759 | 9/1978 |
| FR | 2727190 | 5/1996 |
| FR | 2917348 | 12/2008 |
| WO | 2006066531 | 6/2006 |

\* cited by examiner

*Primary Examiner* — David V Bruce
(74) *Attorney, Agent, or Firm* — Jacox, Meckstroth & Jenkins

(57) ABSTRACT

A vehicle headlight comprising at least one lighting module mounted on a support. The module comprises a base with a mounting surface inclined backward and toward the top of the headlight. The support comprises a corresponding mounting surface. Positioning means with sliders are provided on these surfaces so as to be able to extract the module and fit it by a translational movement in a direction contained within the plane of the mounting surfaces. The housing comprises a removable portion positioned in the extension of the module in the direction of translation of the positioning means with sliders. The wall of the housing comprises precuts on the circumference of the removable portion. This arrangement makes is possible to easily replace a bulky lighting module such as that of a headlight with style functions.

31 Claims, 5 Drawing Sheets

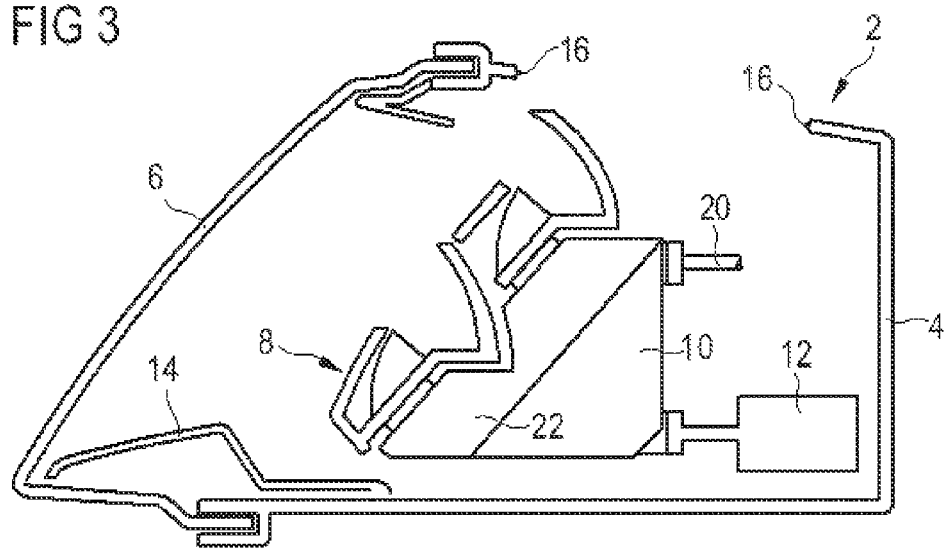
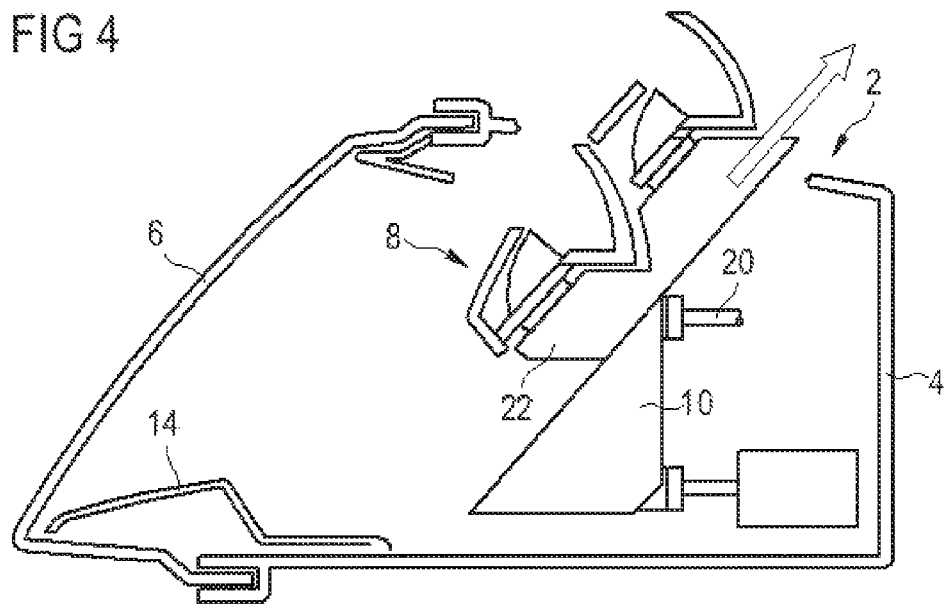

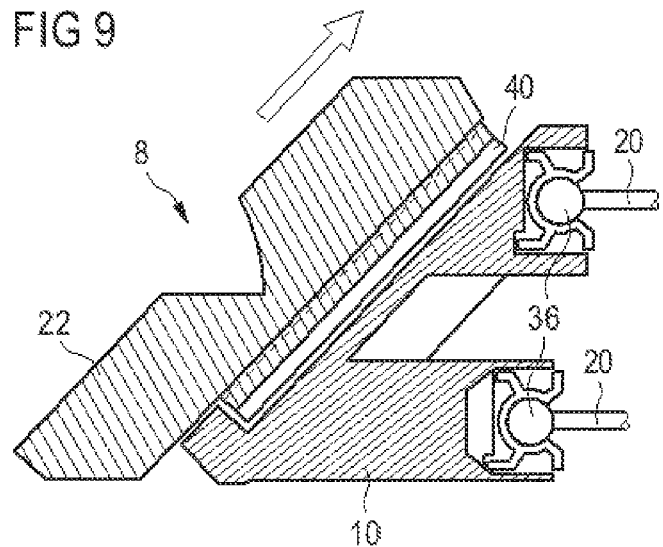
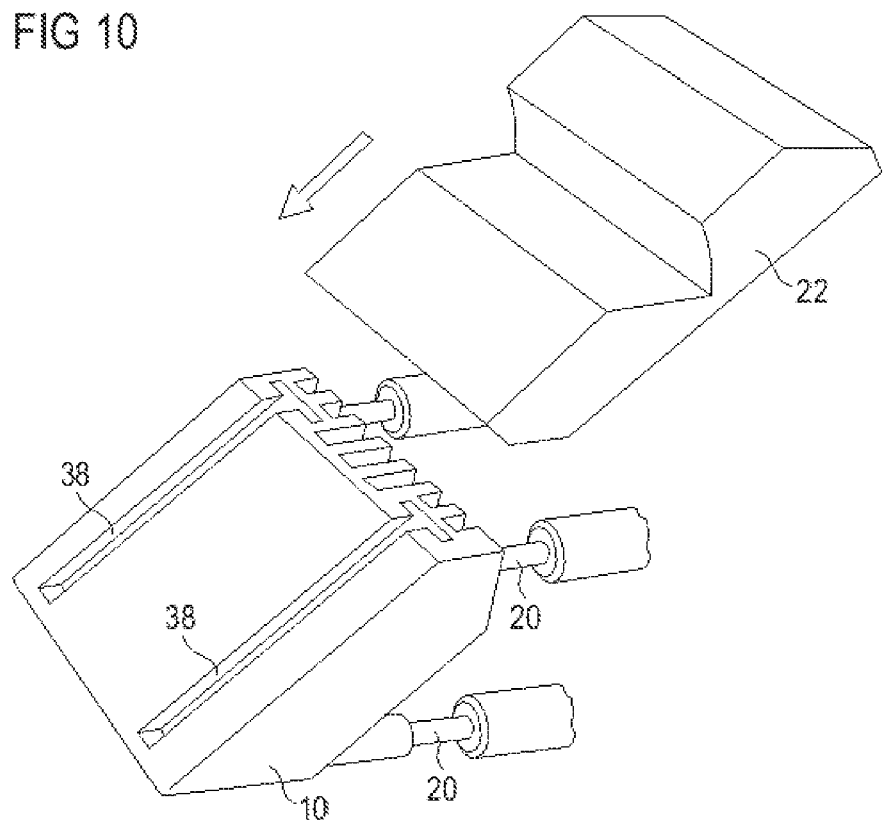

VEHICLE HEADLIGHT MODULE MOUNTED ON SLIDERS, CORRESPONDING SUPPORT AND HEADLIGHT

CROSS-REFERENCE TO RELATED APPLICATIONS

This application claims priority to French Application No. 1158612 filed Sep. 27, 2011, which application is incorporated herein by reference and made a part hereof.

BACKGROUND OF THE INVENTION

1. Field of the Invention

The invention deals with a lighting and/or signaling module, notably for a vehicle. The invention also deals with a lighting and/or signaling module support as well as a lighting and/or signaling device comprising the module and/or the support.

2. Description of the Related Art

The use of light sources of the light-emitting diode (LED) type is becoming increasingly commonplace in motor vehicle headlights and signaling lights. The LEDs have a significantly longer lifetime than the incandescent lamps, namely a routine lifetime greater than 10 000 hours, even ranging up to 35 000 and even 50 000 hours, or significantly more than the lifetime of a motor vehicle. The lifetime of an LED is, however, linked to its operating conditions, namely its operating temperature and the current passing through it. These operating conditions are generally controlled so that the LEDs installed in the vehicle headlights and signaling devices retain a lifetime that is in principle greater than the lifetime of the vehicle and are consequently generally not removable or replaceable.

The same does not apply for the vehicle headlights and signaling devices with conventional incandescent lamps which have to be able to be replaced easily. The regulations, in particular European, relating to vehicle lighting and/or signaling moreover have recently required the user of the vehicle to be able to access the conventional lamps with a view to their replacement.

The lifetime of the LEDs embedded in vehicle headlights and signaling devices can also be influenced, more particularly shortened, according to various parameters linked mainly to the immediate environment. Given the recent nature of the use of LEDs for vehicle lighting and/or signaling, there is as yet very little experience as to long-term durability of these LEDs in these operating conditions. Many opinions agree that defects risk appearing with time and that LED replacements may prove necessary.

The patent document WO 2006/066531 A1, which is equivalent to U.S. Patent Publication No. 2008/0130308, which publication issued as U.S. Pat. No. 7,806,562, discloses a light source module of LED type with rapid mounting. In addition to one or more light sources of LED type, this module comprises a heat dissipator for cooling the light source or sources as well as a rapid fixing device of the bayonet type. This teaching is advantageous from an ease-of-mounting viewpoint, notably that the corresponding assembly comprising light source(s) and heat dissipator can be rapidly and easily replaced. The replacement of one or more light sources of a lighting and/or signaling module, in particular of a headlight, is, however, a potential source of misalignment of the beam. This is particularly true for the LED headlights with beam cut-off. This is because the position of the light source has a direct influence on the cut-off. The solution proposed by this document consequently does not allow the user of the vehicle to replace the light source given that a meticulous adjustment will then be necessary. Such an adjustment is not within the scope of an everyday vehicle servicing department. A removal of the headlight from the vehicle will consequently be necessary.

The patent document FR 2 917 348 A1 discloses a lighting and/or signaling device for a motor vehicle in which the light source is borne by a support that is removable relative to the housing of the device. More specifically, the lens of the device includes an opening through which the light source and its support are positioned. The light source essentially lights in a direction opposite to the lighting and/or signaling direction of the device, a reflector of parabolic type being arranged in the housing facing the light source so as to reflect the rays emitted by the source in the main direction of lighting and/or signaling of the device. Access to the light source is obtained from the outside of the device and of the vehicle. This arrangement offers the advantage of not requiring the presence of an empty space for the passage of the hand of a service engineer or of a tool used by the latter when replacing the light source. This mounting is, however, essentially limited to the light sources of incandescent type. This is because the light sources of LED type are arranged on a printed circuit board (PCB) equipped with a heat dissipator for cooling the LED or LEDs. The mounting provided in this teaching is difficult to apply to a light source of the LED type because of the bulk of these components.

The patent document FR 2 727 190 A1 discloses a headlight for a motor vehicle, in which the housing comprises a rear cover mounted to pivot on the housing. The opening of the housing by pivoting the cover provides access to the main light source. The cover also supports an additional light source for the position light function. The technical solution disclosed in this document is advantageous from a viewpoint of ease of replacement of the light sources but is difficult to apply to light sources of the LED type.

Generally, it should be noted that the architecture of the light sources of the LED type is radically different from that of the incandescent light sources. As already mentioned, the LEDs are usually arranged directly on a board (PCB) which is provided with one or more heat dissipators for cooling the LED or LEDs. This arrangement gives the LED and its equipment a certain bulk. Furthermore, some headlights or rear lights can have LED arrangements that confer upon them an individual nature or even a "signature". The replacements of one or more of the LEDs of such a lighting device may necessitate the removal of the device in a specialist workshop.

What is needed, therefore, is a system and method for implementing the solutions for facilitating replacement of LED-type light sources on a vehicle.

SUMMARY OF THE INVENTION

The aim of the invention is to propose a solution that mitigates at least one of the abovementioned drawbacks. More particularly, the aim of the invention is to propose a solution suitable for facilitating the replacement of LED-type light sources of vehicle headlights and signaling lights.

The subject of the invention is a lighting and/or signaling module notably for a vehicle, comprising: at least one light source suitable for emitting light rays; at least one reflecting surface suitable for reflecting the light rays emitted by the light source in a lighting and/or signaling beam along an optical axis of the module; noteworthy in that it also comprises means for rapidly positioning the module on a support.

The rapid positioning means are preferentially suitable for ensuring the guiding of the module to a final position on the support in a movement to bring the module toward the support. The guiding to the final position is then done solely by the converging movement, that is to say without the involvement of fixing means as such, as, for example, screw-fixing means. The fixing of the module in its final position may, however, require the involvement of additional means.

In one embodiment of the invention, the lighting and/or signaling module produces only the lighting and/or signaling beam, this beam having a predetermined photometry.

According to an advantageous embodiment of the invention, the rapid positioning means comprise means with slider(s), one component of the main direction of the means with slider(s) preferentially corresponding to the optical axis of the module.

According to another advantageous embodiment of the invention, the rapid positioning means are arranged mainly laterally in relation to the module. Preferentially, they are arranged under the module. The latter may, in fact, comprise a base under which the positioning means are arranged.

According to another advantageous embodiment of the invention, the rapid positioning means are configured so that the positioning of the module from an engagement with the support to a final position on the support is obtained exclusively by a translational movement of the module.

According to yet another advantageous embodiment of the invention, the module comprises a heat dissipator for dissipating heat from the or at least one of the light sources, the rapid positioning means being on the heat dissipator, the positioning means preferentially being formed in the material of the heat dissipator.

According to yet another advantageous embodiment of the invention, the main direction or directions of the rapid positioning means extend longitudinally in one or more planes parallel to a vertical plane comprising the optical axis of the module.

According to yet another advantageous embodiment of the invention, the main direction or directions of the rapid positioning means extend longitudinally in one or more transversal planes forming an angle of inclination with a horizontal plane which is between 0° and 90°, preferentially between 20° and 70°, more preferentially between 30° and 50°.

According to yet another advantageous embodiment of the invention, the transversal plane or planes in which the main direction or directions of the rapid positioning means extend are inclined downward and toward the front of the module.

Another subject of the invention is a support for a lighting and/or signaling module, notably for a vehicle, characterized in that the support comprises rapid positioning means intended to cooperate with corresponding rapid positioning means of the module according to the invention.

According to an advantageous embodiment of the invention, the rapid positioning means comprise means with slider, one component of the direction of the means with slider preferentially corresponding to the main direction of lighting and/or signaling of the support.

According to another advantageous embodiment of the invention, the support comprises a surface for mounting the module, the surface being transversal and forming an angle of inclination with a horizontal plane which is between 0° and 90°, preferentially between 20° and 70°, and preferentially between 30° and 50°.

According to yet another advantageous embodiment of the invention, the rapid positioning means are formed in the mounting surface, the support comprising cooling fins behind the mounting face.

Another subject of the invention is an assembly comprising a lighting and/or signaling module, notably for a vehicle, and its support, characterized in that the module conforms to the invention and/or the support conforms to the invention.

According to an advantageous embodiment of the invention, at least one of the module and the support comprises means for fixing the module to the support.

According to another advantageous embodiment of the invention, the fixing means are configured to prevent a translational movement between the module and the support, the means preferentially being gripping and/or immobilizing means.

Another subject of the invention is a lighting and/or signaling device comprising a housing, a lighting and/or signaling module and a support for the module, the module and the support being arranged inside the housing, wherein the module and its support conform to the invention.

According to an advantageous embodiment of the invention, the housing comprises opening means suitable for allowing the module to be taken out by displacement in relation to the support, the displacement being guided by the rapid positioning means, the rapid opening means comprising at least one out of the following means: a removable hatch, a precut wall portion of the housing, a removable lens.

The technical measures of the invention which have just been described allow for an easy replacement of the light source or sources without in any way affecting the setting of the lighting or signaling beam. In fact, the act of replacing the complete module makes it possible to replace the essential optical elements of the lighting and/or signaling device. These elements are preset in the module; its replacement consequently allows for a potentially significant loss of quality of the lighting and/or signaling beam. This facility to remove the module, notably in the case of failure of one or more of the LED light sources, makes it possible to replace the LEDs and their support with new, potentially more efficient, LED models. In fact, given the trend in LEDs, new models will replace the old ones. The fact that the entire module can be replaced will make it possible to dispose of the obsolete LED models and provide replacement modules with LEDs of more recent and more up-to-date technology. This solution will therefore allow for a standardization of the LEDs and consequently a reduction in costs.

Furthermore, the technical measures of the invention which have just been described are particularly advantageous for bulky modules, such as, in particular, the so-called "signature" modules, that is to say those provided with style lighting functions.

These and other objects and advantages of the invention will be apparent from the following description, the accompanying drawings and the appended claims.

Other features and advantages of the present invention will be better understood from the description and the drawings in which:

BRIEF DESCRIPTION OF THE
ACCOMPANYING DRAWINGS

FIG. 3 is a cross-sectional view of the headlight of FIG. 1, showing the step of opening the housing in order to extract the lighting module;

FIG. 4 is a cross-sectional view of the headlight of FIG. 1, showing the step of extracting the lighting module;

FIG. 9 is a cross-sectional view of the base of the module and of its support for the headlight of FIGS. 1 to 7; and FIG. 10 is a perspective view of the base of the module and of the support of FIG. 9, illustrating the positioning and fixing means with sliders.

DETAILED DESCRIPTION OF THE PREFERRED EMBODIMENTS

In the following description, an exemplary embodiment of the invention will be described in a fairly detailed manner. For reasons of convenience and clarity of the explanation, this example deals with a lighting device, that is to say a headlight and its corresponding lighting module usually situated at the front of the vehicle. It is, however, understood that the invention, and more particularly the technical solutions of the examples which follow, apply also to signaling modules, that is to say notably to modules for signaling lights usually situated at the rear of the vehicle.

In the following description, reference will be made to the optical axis of the lighting device. In this context, the use of the terms "front" and "rear" should be understood in relation to the direction of lighting of the modules. When the module is arranged at the front of the vehicle, the expression "front" will correspond with the normal direction of advance of the vehicle, whereas it will be opposite to that direction when the module is arranged at the rear of the vehicle.

Although the invention is essentially oriented toward applications in the vehicle domain, it is nonetheless applicable to the lighting domain in general. The lighting and signaling devices and modules may then be oriented in a different way than in the figures. The relative terms such as "front", "rear", "top", "bottom", etc. used in relation to the figures which illustrate a quite particular orientation of the lighting modules should not consequently be interpreted in a limiting manner.

Figure 1:
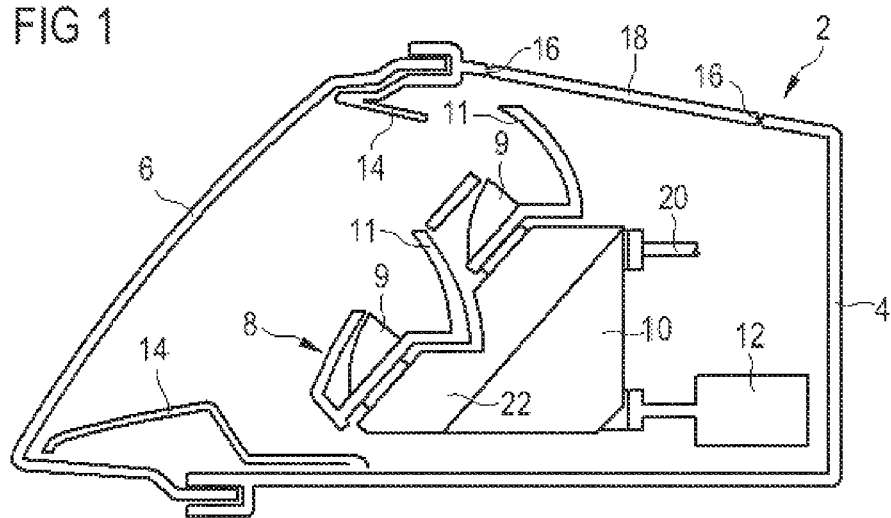
FIG. 1 is a cross-sectional view of a motor vehicle headlight, conforming to the invention.

FIG. 1 illustrates a headlight 2 comprising a housing 4 defining a contained volume, the volume being closed by a lens 6 arranged at the front of the housing 4. The housing 4 encloses a lighting and/or signaling module 8 comprising a number of submodules, each comprising at least one light source of the LED type and a first elliptical reflector 9 and a second parabolic reflector 11. The lighting and/or signaling module 8 comprises a mounting surface or base 22 serving as a cooler for the LEDs and ensuring the fixing of the lighting and/or signaling module 8 to its support 10. The latter is fixed to the housing 4 via swivel-pin fixing means 20 and at least one adjustment means 12 for adjusting the height of the lighting beam produced by the lighting and/or signaling module 8. This at least one adjustment means 12 may comprise an electric motor and an adjusting screw driven by the electric motor and suitable for ensuring an essentially translational displacement of the point of fixing of the support to the at least one adjustment means 12. The headlight 2 may also comprise one or more style masks 14.

The housing 4 of the headlight 2 comprises a precut 16 in an upper area. The precut 16 describes a contour defining an opening 18 for access to the internal volume of the headlight 2. This opening 18 may take various geometrical forms depending in particular on the form and the size of the lighting and/or signaling module 8. It is arranged facing the lighting and/or signaling module 8 taking into account the positioning and guiding means between the lighting and/or signaling module 8 and the support 10.

Figure 2:
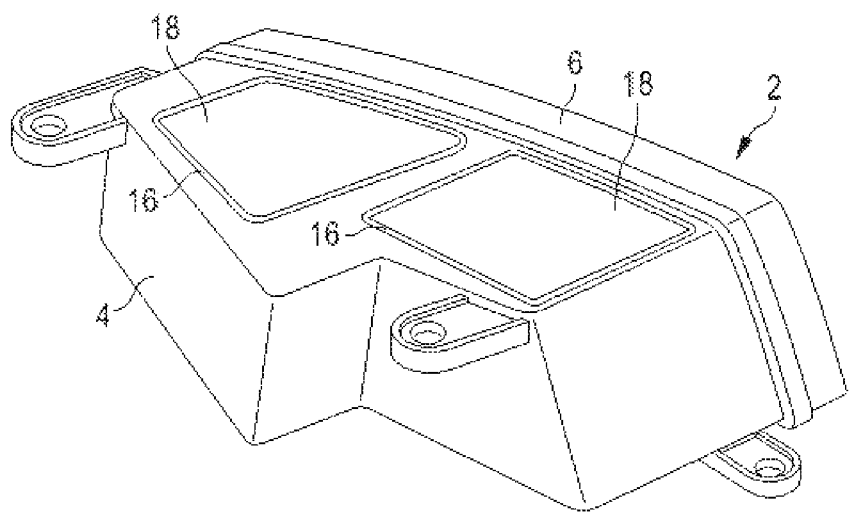
FIG. 2 is a perspective view from behind of the housing of the headlight of FIG. 1.

FIG. 2 shows the housing 4 seen from the rear, and the lens 6. The housing 4 comprises, on its top face, two precut contours 16 thus forming two wall portions 18 giving access to the internal volume of the headlight 2. Each of these wall portions 18 gives access to a lighting and/or signaling module. The lighting and/or signaling module 8 that can be seen in FIG. 1 is a first example of a lighting and/or signaling module 8 of the headlight 2, it being understood that the latter may enclose other lighting and/or signaling module(s).

Access to the top face of the housing 4 is usually fairly easy. This arrangement is, however, preferential and non-essential. There are in fact other positions, such as, for example, on the side and/or the rear. Access to the internal volume of the housing 4 can also be obtained through the lens 6 which may be removable.

In FIG. 3, the housing 4 of the headlight 2 of FIG. 1 has been opened by removing the precut wall portion 18. This opening gives access to the internal volume of the housing 4 and more particularly direct access to the lighting and/or signaling module 8. In the precise case of this exemplary embodiment, the top face of the housing 4 has a large surface area and the formation of an opening on this face makes it possible to create an access that is large enough to extract the lighting and/or signaling module 8.

FIG. 4 illustrates the movement of extraction of the lighting and/or signaling module 8 from the housing 4. The mounting surface 22 of the lighting and/or signaling module 8 on the support 10 is generally planar and inclined toward the rear and upward or, in an equivalent manner, toward the front and downward. The median plane formed by this mounting surface 22 forms an angle of approximately 45° with a horizontal plane. The lighting and/or signaling module 8, or more particularly its mounting surface 22 comprises means with slider cooperating with corresponding means with slider of the support 10. These means are arranged so as to form a sliding or translational link between the lighting and/or signaling module 8 and the support 10. The direction of sliding of these means is generally oriented toward the opening formed or that can be formed in the wall of the housing 4. In the precise case of this exemplary embodiment, the direction of the means with slider (illustrated by the arrow) is oriented generally in a longitudinal plane so that the movement of extracting the lighting and/or signaling module 8 is generally done toward the rear and the top of the headlight 2.

To extract the lighting and/or signaling module 8 from the housing 4, the fixing or immobilizing means preventing the displacement of the lighting and/or signaling module 8 in the sliding direction have to be released. These means (not represented) can take various forms such as, for example, one or more tabs that can be moved in a direction generally perpendicular to the direction of sliding of the lighting and/or signaling module 8 in relation to the support 10. The fixing or immobilizing means may also comprise one or more cam gripping devices acting mainly in a direction generally perpendicular to the direction of sliding of the lighting and/or signaling module 8 in relation to the support 10.

Figure 5:
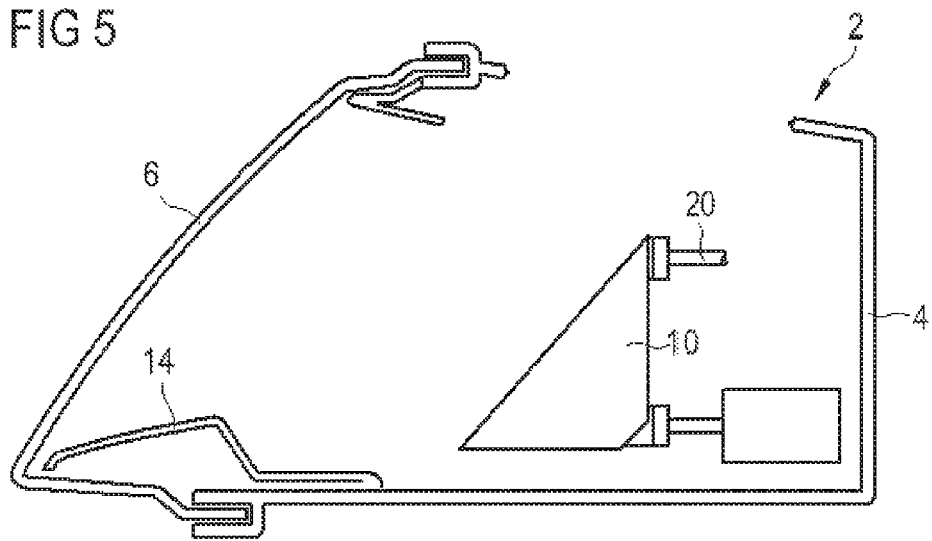
FIG. 5 is a cross-sectional view of the headlight of FIG. 1, showing the housing after extraction of the lighting module.

FIG. 5 illustrates the headlight 2 without the lighting and/or signaling module 8, that is to say in a state in which the lighting and/or signaling module 8 has been extracted through the opening formed in the wall of the housing 4.

Figure 6:
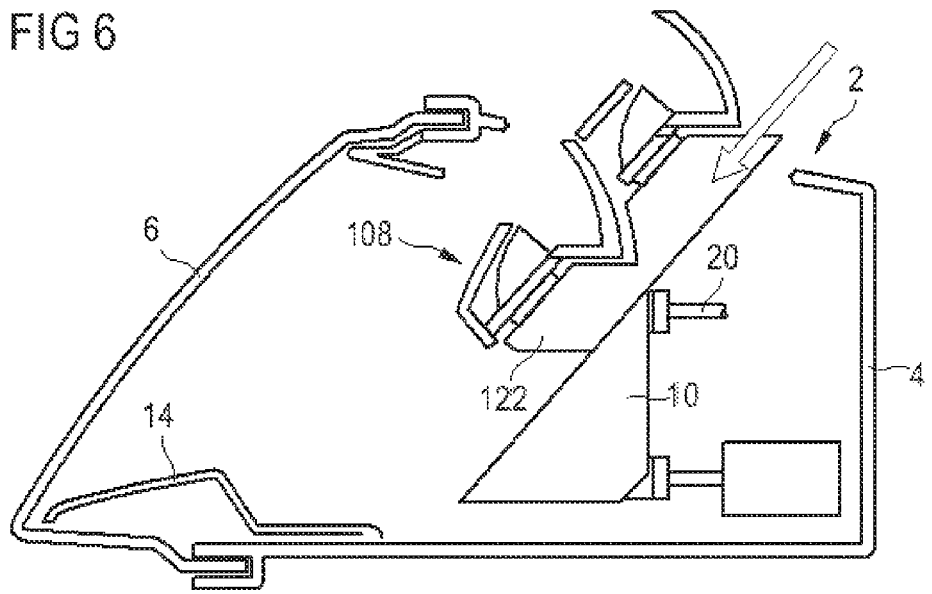
FIG. 6 is a cross-sectional view of the headlight of FIG. 1, showing the step of inserting a replacement lighting module.

In FIG. 6, a replacement lighting and/or signaling module 108 is illustrated in an intermediate position during the positioning movement in relation to the support 10. The replacement module 108 may be the initial lighting and/or signaling module 8 after it has been checked, maintained or overhauled, or else another equivalent module intended to replace the initial lighting and/or signaling module 8. By virtue of the positioning means with slider, the lighting and/or signaling module 108 can be guided by a translational movement to a final position corresponding to an abutment between the lighting and/or signaling module 108 and the support 10. The downward inclination of the direction of sliding of the lighting and/or signaling module 108 in relation to the support 10 is particularly advantageous because it allows for a final positioning that is stable because of the effect of gravity. No particular effort has to be maintained on the lighting and/or signaling module 108 until the fixing or immobilizing means are activated. This measure is a guarantee of mounting accuracy, this accuracy being particularly important for headlights for which the geometry of the lighting functions, in particular the "high beam" function, has to be observed for regulatory reasons.

Figure 7:
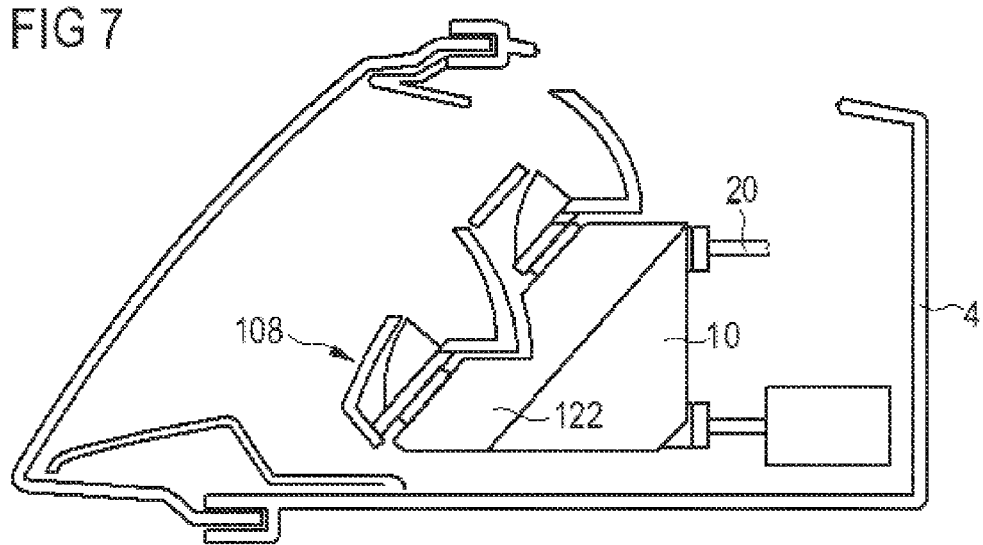
FIG. 7 is a cross-sectional view of the headlight of FIG. 1, showing the housing in which the replacement lighting module is fitted.

FIG. 7 illustrates the replacement lighting and/or signaling module 108 in its final position on the support 10. The fixing and/or immobilizing means (not represented in FIG. 7) are then activated so as to prevent any relative movement between the lighting and/or signaling module 108 and the support 10.

The opening formed in the housing 4 can then be closed by refitting the wall portion that has been removed. Its fixing can be ensured by gluing.

Figure 8:
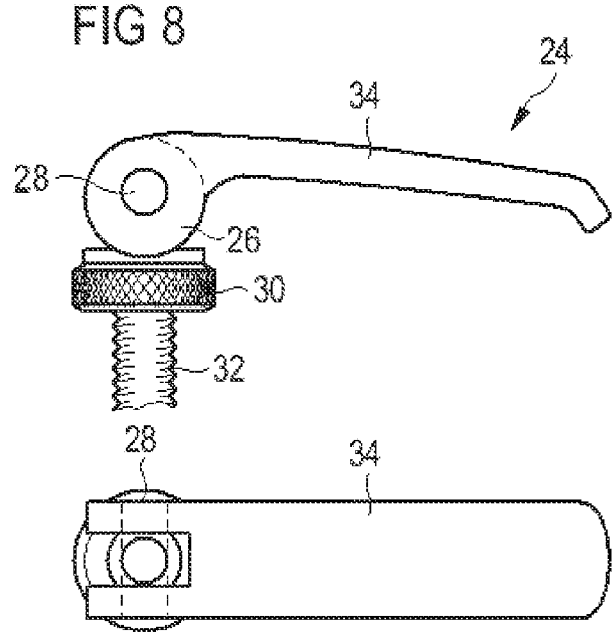
FIG. 8 is a plan view and an elevation view of a means for immobilizing the module in relation to its support in the headlight of FIGS. 1 to 7.

FIG. 8 illustrates an exemplary embodiment of the means for immobilizing the lighting and/or signaling module 8 along the means with slider in relation to the support 10. This is a cam lever 24 in which the rotation of the lever 34 acts via a cam 26 of the lever 34 and a pivot link 28 on a rod 32. The cam 26 attached to the lever 34 slides over a bearing surface 30 and displaces the pivot axis 28 in a longitudinal direction of the rod 32. This movement of small amplitude makes it possible to exert an amplified effort on the rod 32. In the case of the exemplary embodiment which has been described, the rod 32 may be attached to an element sliding in a slider of the support 10 or of the lighting and/or signaling module 8, the cam lever 24 being arranged on the other of the support 10 and the lighting and/or signaling module 8. The actuation of the cam lever 24 then makes it possible to exert an effort pressing the sliding element on the slider and therefore pressing the support 10 and the lighting and/or signaling module 8 against one another.

Other fixing and/or immobilizing devices, in particular those well known per se to the person skilled in the art, can obviously be implemented in the context of the invention.

FIGS. 9 and 10 illustrate with more detail the base 22 of the lighting and/or signaling module 8 and the support 10, notably the positioning means with sliders. The support 10 is of solid construction. It comprises, in its rear part, swivel-pin fixing points 36 ensuring the link between the support 10 and the swivel-pin fixing means 20 for fixing the support 10 to the housing 4. The swivel-pin fixing points 36 may be fixing capsules well known per se to the person skilled in the art. FIG. 10 shows that the support 10 comprises two sliders 38 on its module mounting face. These two sliders 38 have a generally T-shaped section so as to ensure a dual function of guiding in the general plane of the mounting face and a function of retention in a direction generally perpendicular to the plane. The two sliders 38 are generally parallel. They are formed directly in the mass of the support 10. The latter is preferentially made of metal material such as aluminum suitable for providing an LED cooling function. It should moreover be noted that cooling fins can be provided behind the support 10. The sliders 38 stop before the bottom edge of the support 10 in order to provide an abutment function. The base 22 of the lighting and/or signaling module 8 comprises corresponding sliders 40 suitable for cooperating with the sliders 38 of the support 10. In the precise case of the exemplary embodiment which is being described, the support 10 comprises sliders in the form of grooves and the base 22 comprises corresponding sliders 40 in the form of ribs. The reverse can obviously also be implemented with the invention. It would also be possible to provide a combination of these two configurations, namely in which the support 10 comprises at least one slider in the form of a groove and at least one slider in the form of a rib, and similarly for the base 22 of the lighting and/or signaling module 8.

Other means for positioning the lighting and/or signaling module 8 in relation to its support 10 can obviously be implemented. These means are preferentially with slider(s). Their role is to ensure the guiding of the lighting and/or signaling module 8 during its extraction and/or its placement in the housing 4 and its positioning in relation to the support 10.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting and/or signaling module for a vehicle, comprising:
   at least one light source suitable for emitting light rays;
   at least one reflecting surface suitable for reflecting said light rays emitted by said at least one light source in a lighting and/or signaling beam along an optical axis of said lighting and/or signaling module;
   wherein said lighting and/or signaling module also comprises,
   means for rapidly positioning said lighting and/or signaling module on a support;
   wherein said at least one light source is a light-emitting diode (LED);
   wherein said rapid positioning means facilitates placing said lighting and/or signaling module on said support in a headlamp housing adapted to be mounted on the vehicle.

2. The lighting and/or signaling module according to claim 1, wherein said rapid positioning means comprise means with slider(s), one component of a direction of said means with slider(s) corresponding to said optical axis of said lighting and/or signaling module.

3. The lighting and/or signaling module according to claim 1, wherein said rapid positioning means are arranged laterally in relation to said lighting and/or signaling module.

4. The lighting and/or signaling module according to claim 1, wherein said rapid positioning means are configured so that the positioning of said lighting and/or signaling module from an engagement with said support to a final position on said support is obtained exclusively by a translational movement of said lighting and/or signaling module.

5. The lighting and/or signaling module according to claim 1, wherein said lighting and/or signaling module comprises a heat dissipator for dissipating heat from said at least one light source, said rapid positioning means being on said heat dissipator, said rapid positioning means being formed in a material of said heat dissipator.

6. The lighting and/or signaling module according to claim 1, wherein said main direction(s) of said rapid positioning means extend longitudinally in one or more planes parallel to a vertical plane oriented essentially on said optical axis of said lighting and/or signaling module.

7. The lighting and/or signaling module according to claim 1, wherein said main direction(s) of said rapid positioning means extend longitudinally in one or more transversal planes forming an angle of inclination with a horizontal plane which is between 0° and 90°.

8. The lighting and/or signaling module according to claim 7, wherein said one or more transversal planes in which said main direction(s) of said rapid positioning means extend are inclined downward and toward a front of said lighting and/or signaling module.

9. The lighting and/or signaling module according to claim 1, wherein said main direction(s) of said rapid positioning means extend longitudinally in one or more transversal planes forming an angle of inclination with a horizontal plane which is between 20° and 70°.

10. The lighting and/or signaling module according to claim 1, wherein said main direction(s) of said rapid positioning means extend longitudinally in one or more transversal planes forming an angle of inclination with a horizontal plane which is between 30° and 50°.

11. A support for a lighting and/or signaling module notably for a vehicle, wherein said support comprises rapid positioning means intended to cooperate with corresponding rapid positioning means of said lighting and/or signaling module according to claim 1.

12. The support according to claim 11, wherein said rapid positioning means comprise means with slider(s), one component of a direction of said means with slider corresponding to a main direction of lighting and/or signaling of said support.

13. The support according to claim 11, wherein said support comprises a surface for mounting said lighting and/or signaling module, said surface being transversal and forming an angle of inclination with a horizontal plane which is between 0° and 90°.

14. The support according to claim 13, wherein said rapid positioning means are formed in said mounting surface, said support comprising cooling fins behind said mounting surface.

15. The support according to claim 11 wherein said support comprises a surface for mounting said lighting and/or signaling module, said surface being transversal and forming an angle of inclination with a horizontal plane which is between 20° and 70°.

16. The support according to claim 11, wherein said support comprises a surface for mounting said lighting and/or signaling module, said surface being transversal and forming an angle of inclination with a horizontal plane which is between 30° and 50°.

17. An assembly comprising a module adapted to provide at least one of a lighting or a signaling function, for a vehicle, and its support, wherein said module conforms to claim 1 and said support comprises rapid positioning means intended to cooperate with corresponding rapid positioning means.

18. The assembly according to claim 17, wherein said module and said support comprises means for fixing said lighting and/or signaling module to said support.

19. The assembly according to claim 18, wherein said fixing means are configured to prevent a translational movement between said module and said support, said fixing means being at least one of a gripping or an immobilizing means.

20. A lighting and/or signaling device comprising a housing, a module adapted to provide at least one of a lighting or a signaling function and a support for said module, said module and said support being arranged inside said housing, wherein said module and its support conform to claim 17.

21. The lighting and/or signaling device according to claim 20, wherein said housing comprises rapid opening means suitable for allowing said module to be taken out by displacement in relation to said support, said displacement being guided by said rapid positioning means, said rapid opening means comprising at least one out of the following means: a removable hatch, a precut portion of wall of said housing, a removable lens.

22. A lighting and/or signaling module for a vehicle, comprising:
at least one light source suitable for emitting light rays;
at least one reflecting surface suitable for reflecting said light rays emitted by said at least one light source in a lighting and/or signaling beam along an optical axis of said lighting and/or signaling module;
wherein said lighting and/or signaling module also comprises,
a positioner for rapidly positioning said lighting and/or signaling module on a support;
wherein said at least one light source is a light-emitting diode LED);
wherein said rapid positioning means facilitates placing said lighting and/or signaling module on said support in a headlamp housing adapted to be mounted on the vehicle.

23. The lighting and/or signaling module according to claim 22, wherein said positioner comprises means with slider(s), one component of a direction of said means with slider(s) corresponding to said optical axis of said lighting and/or signaling module.

24. The lighting and/or signaling module according to claim 22, wherein said positioner is arranged laterally in relation to said lighting and/or signaling module.

25. The lighting and/or signaling module according to claim 22, wherein said positioner is configured so that the positioning of said lighting and/or signaling module from an engagement with said support to a final position on said support is obtained exclusively by a translational movement of said lighting and/or signaling module.

26. The lighting and/or signaling module according to claim 22, wherein said lighting and/or signaling module comprises a heat dissipator for dissipating heat from said at least one light source, said positioner being on said heat dissipator, said positioner being formed in a material of said heat dissipator.

27. The lighting and/or signaling module according to claim 22, wherein said main direction(s) of said positioner extend longitudinally in one or more planes parallel to a vertical plane oriented essentially on said optical axis of said lighting and/or signaling module.

28. The lighting and/or signaling module according to claim 22, wherein said main direction(s) of said positioner extend longitudinally in one or more transversal planes forming an angle of inclination with a horizontal plane which is between 0° and 90°.

29. The lighting and/or signaling module according to claim 28, wherein said one or more transversal planes in which said main direction(s) of said positioner extend are inclined downward and toward a front of said lighting and/or signaling module.

30. The lighting and/or signaling module according to claim 22, wherein said main direction(s) of said positioner extend longitudinally in one or more transversal planes forming an angle of inclination with a horizontal plane which is between 20° and 70°.

31. The lighting and/or signaling module according to claim 22, wherein said main direction(s) of said positioner extend longitudinally in one or more transversal planes forming an angle of inclination with a horizontal plane which is between 30° and 50°.

* * * * *